(12) United States Patent
Castano et al.

(10) Patent No.: US 6,191,354 B1
(45) Date of Patent: *Feb. 20, 2001

(54) TRANSMISSION CONDUIT AND METHOD OF INSTALLATION

(75) Inventors: Ruben C. Castano; Patricio A. Sorichetti, both of Buenos Aires (AR)

(73) Assignee: Professional Communications, S. A. (AR)

(*) Notice: Under 35 U.S.C. 154(b), the term of this patent shall be extended for 0 days.

This patent is subject to a terminal disclaimer.

(21) Appl. No.: 09/165,778

(22) Filed: Oct. 2, 1998

Related U.S. Application Data

(63) Continuation-in-part of application No. 09/061,595, filed on Apr. 16, 1998.

(51) Int. Cl.[7] ........................................... H02G 7/00
(52) U.S. Cl. ................................................... 174/40 R
(58) Field of Search ........................... 174/40 U, 40 CC, 174/40 TP, 41, 43, 44, 45 R, 45 TD, 38

(56) References Cited

U.S. PATENT DOCUMENTS

| | | | |
|---|---|---|---|
| 2,029,044 | * 1/1936 | Westlinning | 228/130 |
| 3,360,409 | * 12/1967 | Jachimowicz et al. | 174/107 |
| 3,629,489 | * 12/1971 | Jachimowicz et al. | 174/107 |
| 4,673,247 | * 6/1987 | Oestreich | 350/96.23 |
| 4,776,665 | * 10/1988 | Oestreich | 350/96.23 |
| 4,795,856 | * 1/1989 | Farmer | 174/40 R |
| 5,468,913 | * 11/1995 | Seaman et al. | 174/102 R |
| 5,513,292 | * 4/1996 | Rowland et al. | 385/100 |
| 5,758,005 | * 5/1998 | Yoshida | 385/136 |

* cited by examiner

Primary Examiner—Kristine Kincaid
Assistant Examiner—Adolfo Nino
(74) Attorney, Agent, or Firm—Squire, Sanders & Dempsey L.L.P.

(57) ABSTRACT

A tubular channeling unit including a grounded external metal or conductive polymer sheathing and an internal longitudinal cavity, and method for laying such a tubular channeling unit by suspension on a high voltage aerial power line system including at least two towers supporting a set of high voltage electrical conductors suspended from the towers at a specified height above the ground and at a minimum predetermined safety level.

22 Claims, 8 Drawing Sheets

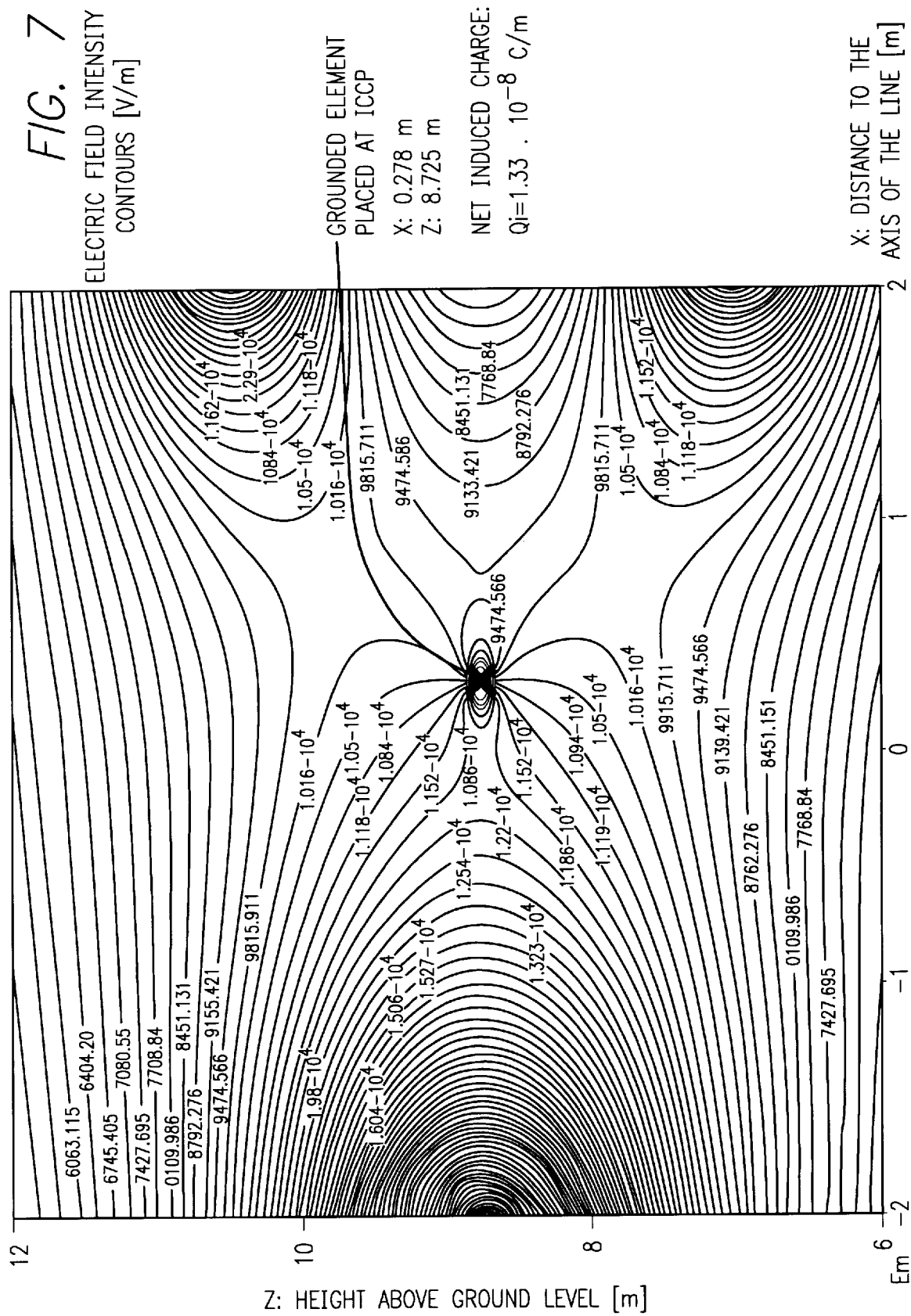

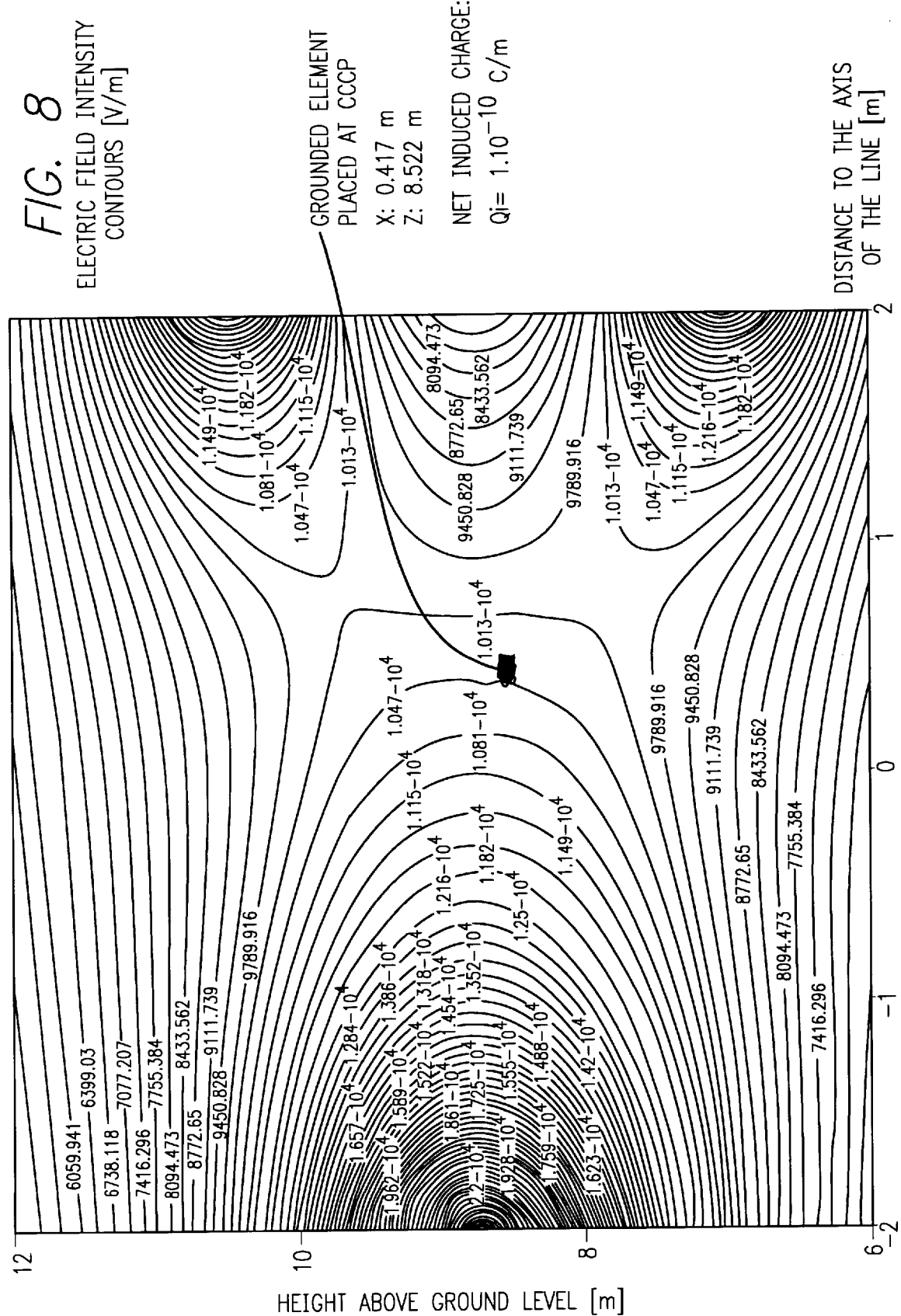

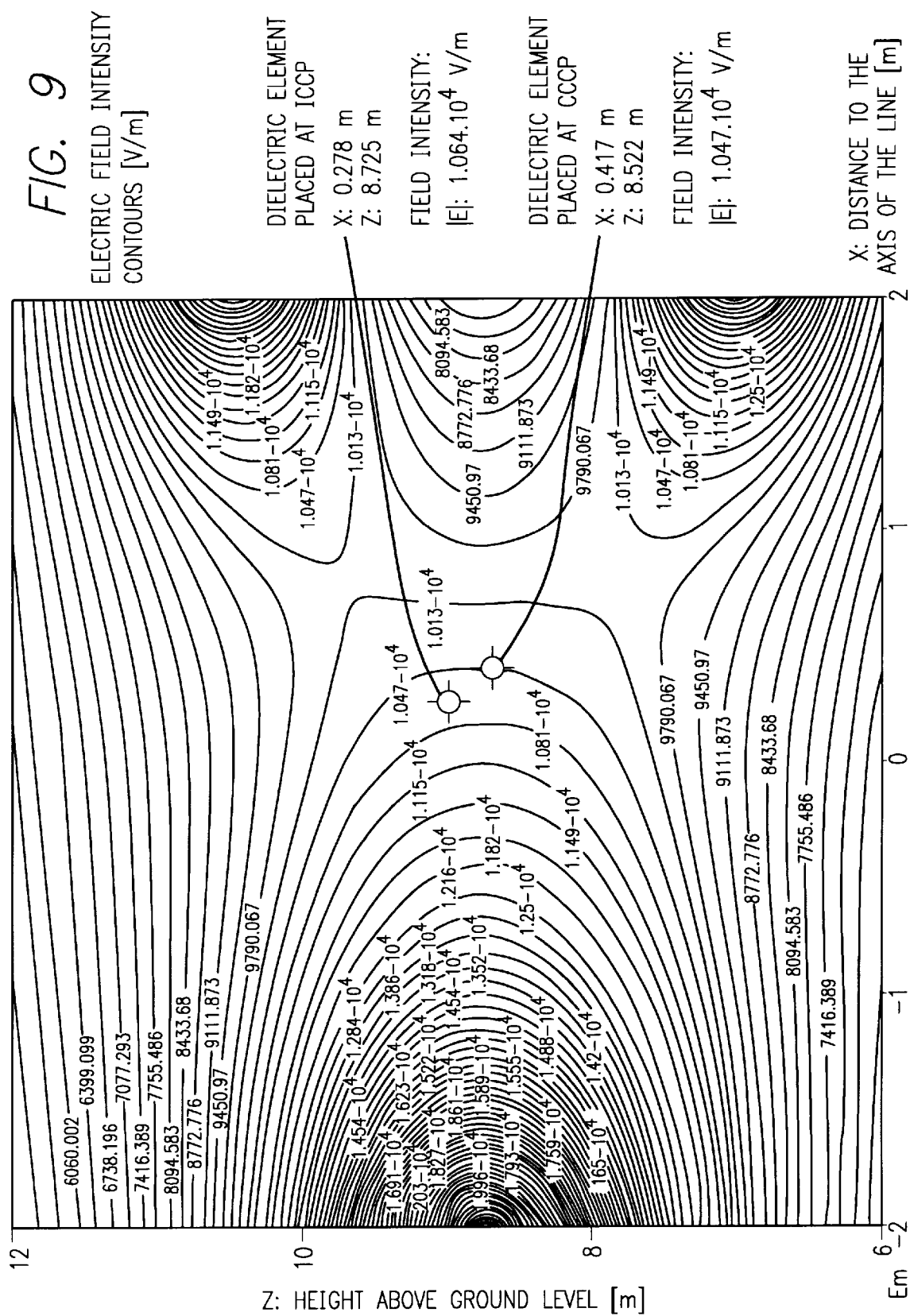

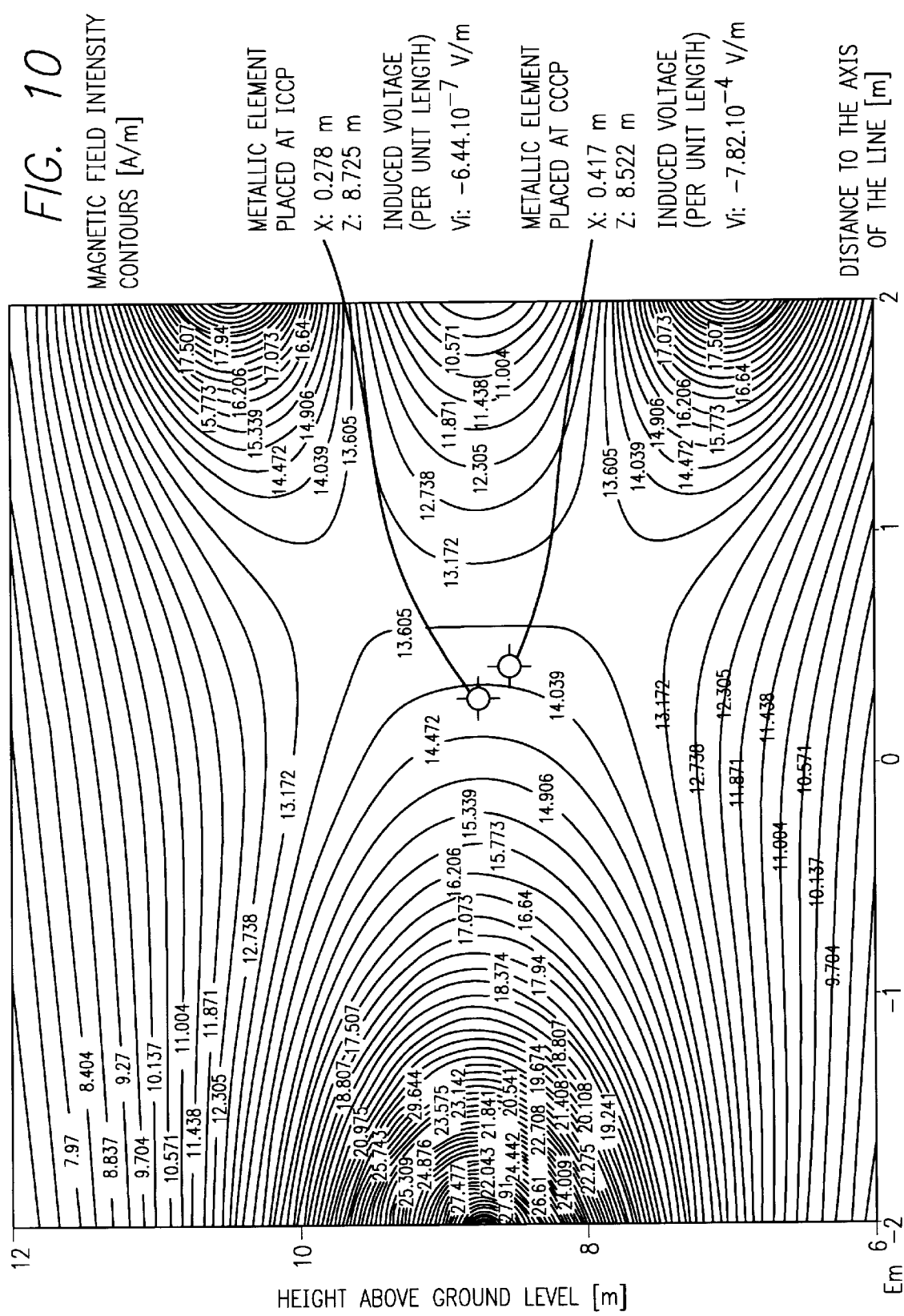

TRANSMISSION CONDUIT AND METHOD OF INSTALLATION

RELATED APPLICATIONS

The present application is a continuation-in-part of the copending patent application Ser. No. 09/061,595, filed Apr. 16, 1998.

BACKGROUND OF THE INVENTION

1. Field of the Invention

The invention relates to a new concept for the laying of transmission, conduction and communication lines, and particularly, it details improvements in the laying of channeling lines for applications such as signal transmission, energy and fluid conduction and other purposes.

The invention has been particularly developed for its application in the laying of optical fibers within a channeling line placed on towers for high voltage transmission lines. In application, however, the new channeling unit may be applied to other transmission, conduction and communication applications which may be continued within the cavity of a specially designed tubular channeling structure. In order to simplify the description herein, the specification will be directed to the laying of optical fibers. It is to be understood, however, that the same concepts or similar concepts may be applied to other types of signal or power transmission lines and the conduction of fluids generally.

From the analysis of electric and magnetic field configurations in high voltage transmission lines, it has been discovered that there are two particular positions and a zone in which the channeling line may be most optimally placed so as to minimize the electromagnetic effects. Thus, a zone is defined that presents several advantages for the laying of channeling lines of application means. In addition, the invention further contemplates that the channeling lines may also be formed from a dielectric sheathing, and placed within the zone while maintaining the several advantages for the installation of the channeling lines.

2. Description of Related Art

The transmission over large distances of communication signals or electrical power and related applications, may be carried out by the installation or "laying" of cables. The laying is accomplished using any of the three known procedures: underground, underwater and aerial installation.

Underground installation consists of burying the cables lodged in pipes and hermetic sheaths. This method has several inconveniences, such as the high installation and operating costs particularly when it is necessary to make repairs or modifications in the network forcing the continuous excavation and covering of ditches. At the same time, underground installation may become dangerous, generally because the cables are not visible and might be cut or damaged during excavations.

Underwater installation is accomplished through the laying of submarine cables or of cables which lie in the bed of rivers and lakes. It is yet a more expensive technology than the underground method discussed above, as it may require laying cables at very deep depths in order to avoid accidents caused by large ships or other aquatic transportation systems. Further, the cables must be provided with hermetic sheaths of great resistance to the hydraulic pressures and to the degradation produced by the underwater environment.

Aerial installation is accomplished through the use of poles, towers or other supports which hold in place the cables and which are arranged at a certain distance from the ground level, designated as the "safety level." The access to an aerial system is easier and quicker than underground or underwater cables, making possible the direct repairs and modifications of the network and of its connections. The laying of optical fibers on high voltage overhead lines would allow the set up of a communications network of high quality, using the towers of preexistent electrical networks and their right-of-way, with a noticeably lower cost than the cost of an underground installation.

The aerial laying of optical fibers may be carried out utilizing the following techniques:

Laying Over High Voltage Conductors

The tower suspended, high voltage power line systems generally include at the upper part of the tower at least one metallic cable designated as being a security cable or "guard wire". The aim of this security cable is to protect the high voltage network and its supporting structures from possible atmosphere electric discharges such as lighting. The determination of the characteristics of such a cable are governed by two main conditions:

Structural requirements, taking into account the span length, or the distance between towers, and the action of the wind, ice and snow loads.

Electric requirements, taking into account the short-circuit current and the potential maximum current pulse of a lightning strike.

For the laying of optical fibers, one of the known methods contemplates replacing the guard wire with a specially designed combination of a security cable and optical fibers. In this apparatus, the security cable performs the function of the guard wire and supports the optical fibers, simultaneously.

At present, with respect to the installation method for such a combination cable/optical fiber assembly, there are three options. First, installation on un-energized lines may be accomplished when a new power line system is installed, and the cable/optical fiber is incorporated during the procedure of the high voltage line installation.

Second, for the installation to be carried out on an operational preexistent power line system, to replace the guard wire with a combination cable/optical fiber, it is necessary to disconnect the electric supply to the power lines to carry out the installation. This situation involves an economic loss due to the stoppage of the electric service, and to the corresponding payments for such service.

Third, in order to avoid inconveniences caused by the interruptions in the services, it is possible to accomplish installation with the lines energized on an operational preexistent power line system. However, special installation techniques must be used which allow the laying of combination guard wire cable/optical fibers with the high voltage lines energized. These methods are more expensive and slower, and involve higher risks to workers installing the cables.

Laying below the high voltage conductors may be possible using a cable made up of dielectric materials, which protect and support the optical fibers when they are laid below the energized conductors. This method makes possible installation with the energized lines at a lower cost, with less interruptions in the service and with a lower load on the towers by the effects of the wind due to the lower height at which the cable is held.

In order to support the cable, there exist two options. First, a dielectric cable may be self-supported using a central core of aramidic fiber such as the product sold by the DuPont corporation under the tradename "KEVLAR," to support the mechanical stress. Support may also be provided by a "messenger cable" of aramidic fiber which supports the dielectric cable which contains the optical fibers.

In either of these options, the cable design must take into account the structural requirements, the function of the length of the span (or distance between the towers), and the action of the loads caused by atmospheric factors (wind, ice and snow). Nevertheless, the use of dielectric materials on the sheath of the optical cable makes it necessary to take into account, particularly, the environmental electromagnetic conditions, which generate the following inconveniences:

(a) Degradation of the dielectric sheath of the cable by electromagnetic effects which has forced the use of the method only on lines of the same voltages or lower than 66 KV, or in aerial lines with middle and high tension superior to 50 KV.

(b) Degradation of the external sheath due to the environmental conditions, the action of the wind, erosion, solar radiation, rain and ice, etc.

(c) Degradation of the external sheath due to the effect of the regional fauna such as mainly, the birds which sit on or peck the sheath.

On the other hand, the existence of structural limitations due to the cable design, or its use in spans superior to 100 m, has not been allowed in layings with spans superior to 150 m.

The installation of metallic channeling lines in an aerial, high voltage, transmission system causes changes in the impedance of the line under normal operating conditions. These changes are due to the capacitive (electric) and inductive (magnetic) coupling between the power carrying conductors of the high voltage transmission system and the channeling line. Moreover, the inductive coupling causes parasitic currents to flow in or on the channeling line. The effects of these couplings are not cancelled by the transposition of the power line conductors, since, for safety reasons, the channeling line has to be grounded at each support tower. On the other hand, dielectric covered channeling lines present several inconveniences. In particular, the degradation of the dielectric cover due to the effects of the electric field surrounding the power conductors.

BRIEF SUMMARY OF THE PRESENT INVENTION

The invention detailed herein addresses and solves many of the problems raised by prior installation systems and apparatus. The method and apparatus contemplate the laying of a cable within a grounded tubular sheath, which sheath may carry inside the optical fibers. The tubular sheath is secured to the power line tower structures within an installation envelope defined at its lower limit by the standardized security limit or safety level for the power line towers, and inside the protected area defined at its upper limit by the guard wire.

This technological development, though the simplicity of its features offers the following advantages. First, it simplifies noticeably the installation of the optical fiber cable on towers having energized lines. Second, it minimizes the necessity of the programmed power cuts on the electric wires during installation of the optical fibers. Third, it is easily handled during installation, service and repair. Fourth, it offers an appropriate protection to the optical fibers against the electromagnetic and environmental effects, extending the useful life of the cable. Fifth, it places a smaller load on the towers in comparison with a laying on top of the structure, due to a smaller lever arm. Sixth, it diminishes the electrical requirements of the cable, since it doesn't act as the guard wire. Seventh, it allows the designer a greater freedom for the choice of the mechanical parameters of the cable, reducing noticeably the costs, for example, making possible the use of smaller sections and optimizing the design for different lengths. Eighth, it separates the mechanical requirements from the electrical ones, this makes it possible to improve the cable design, reducing noticeably its costs and simplifying the installation.

In order to better understand the great impact that the new cable laying system has on the reduction of the acquisition and operating costs, in comparison with the traditional techniques, attached as Appendix A is a graphic representation of an installation cost analysis.

BRIEF DESCRIPTION OF THE FIGURES

For a better clarity and comprehension of the method and apparatus of this invention, it is illustrated with different drawings in which it has been represented in one of its preferred embodiments to be understood as an illustrative example.

FIG. 7 graphically depicts the electric field intensity been plotted for a metallic or onductive channeling line placed as shown in FIG. 6;

FIG. 8 graphically depicts the electric field intensity plotted for the installation of the metallic or conductive channeling line placed in a first alternative position;

FIG. 9 shows the electric field configuration without the metallic or conductive channeling line.

FIG. 10. shows the intensity of the magnetic field (H-field) sustained by the power conductors.

DETAILED DESCRIPTION OF THE FIGURES AND THE PREFERRED EMBODIMENT

In the figures it may be observed that the following distances are kept: first, the minimum distance between a low voltage cable and the tubular channeling unit, whatever the lags that one or the other may present in the laying; and second, the minimum distance between the tubular channeling unit and the safety limit (safety level), that the regional rules or the rules of each country state with respect to the ground, the electrical and mechanical minimum distances to the energized conductors, as well as the location of the tubular channeling unit inside the protected zone defined by the guard wire.

In the different figures, the same reference numbers indicate the equivalent or corresponding parts, and the assemblies of various elements have been marked with the following designations as listed, for convenience, at the end of the specification.

Taking into account the aims defined, the improvements in the laying of channeling lines for various applications, such as signal transmission, energy and fluid conduction and other purposes; of the type that use high voltage aerial line systems mainly formed by support towers (a) having a set of high voltage conductors (b), which, at the top include a guard wire (2) laid among such towers (a). The set of high voltage conductors (b) are laid among the towers (a) at a certain distance from the ground, arranged over the predetermined level (s); and then, in a zone delimited at the lower side by such level (s) and inside the guard wire protection zone (p), along all the distance among the towers, it is arranged a tubular channeling unit (c), that, laid among the same towers (a), has a grounded external metal sheathing (4), forming an internal longitudinal cavity, that forms the channeling unit for the various applications such as optical fiber cables (6).

The invention consists of a lengthened tubular channeling unit (c) having special features, which is laid in a special zone of the towers (a) that supports the high voltage lines (b), without damaging or altering their structures, and without changing the guard wire (2) arranged in the highest zone of such towers (a).

For new high voltage installations, the laying of the lengthened tubular channeling unit (c), is made possible during the arrangement of the towers (a) without the system being energized.

By comparison, if it is applied to preexistent installations, the laying of the new cable may be undertaken with the network energized, without the necessity of making cuts in the power line transmission of the installation.

Specifically, the tubular channeling unit (c) consists of the external metal sheathing (4), for example, of iron, that sheathes or coats an aluminum pipe (5), with a longitudinal cavity defined within this pipe (5), which is prepared to channel through it transmission application apparatus such as communication lines, signal transmission lines, energy conductors, liquids or gaseous fluids or any of the other applications mentioned above.

Figure 1:
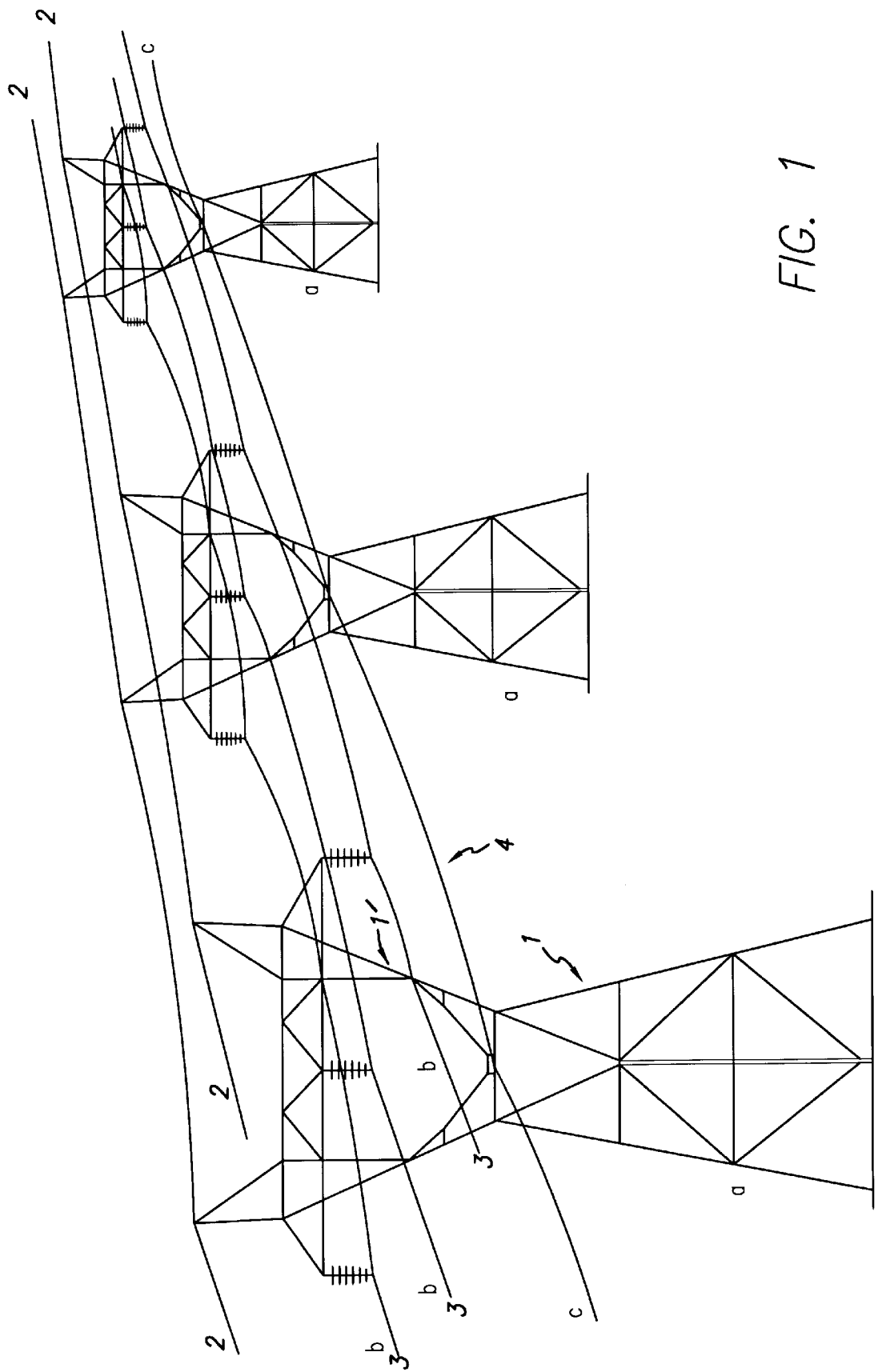
FIG. 1 is a view in perspective corresponding to a supporting tower of high voltage lines, on which may be seen the laying of the new tubular channeling unit.
Figure 3:
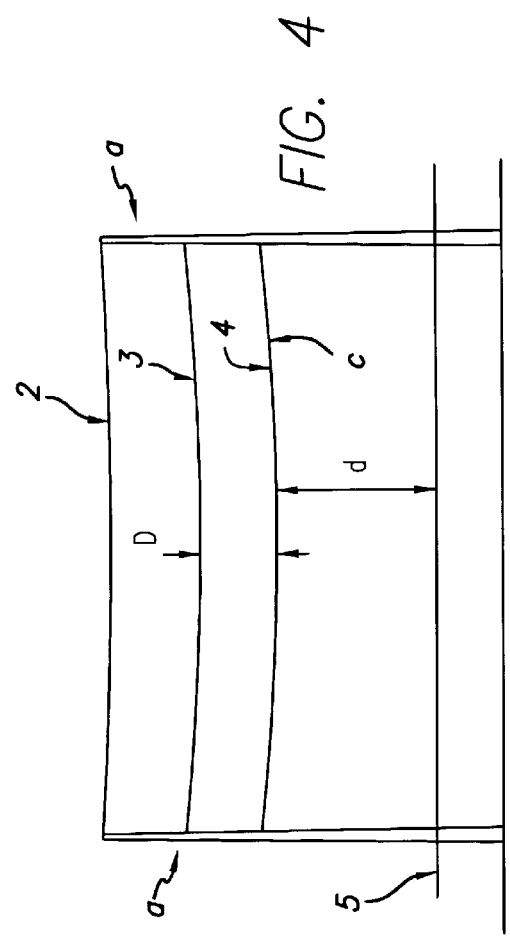
FIG. 3 is a cross section of the new tubular channeling unit, showing the tubular shape of its sheathing, the layers that form it and the channel defined therein, that in this embodiment corresponds to a set of cables of optical fibers.

In a preferred but not restrictive embodiment, the longitudinal cavity of the aluminum pipe (5), provides a channel for optical fiber cables (6) with their correspondent sheaths, arranged around a dielectric core (7) as shown in FIG. 3. By the presence of the external metal sheathing (4), made of iron and combined with the aluminum pipe (5), the new cable becomes self-supporting, with the characteristic that its external sheath (4) is not degradable by the ionic or the environmental effects, the action of the wind, erosion, ultraviolet radiation, rain or hydro-meteors, birds, rodents, insects, etc.

Figure 4:
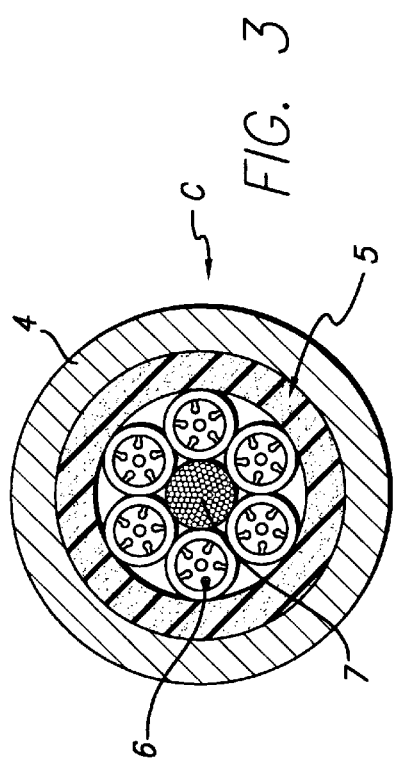
FIG. 4 is a schematic of two towers where it is shown the installation of the new tabular channeling unit, with reference to the safety or security level about the ground, and one of the high voltage cables.
Figure 2:
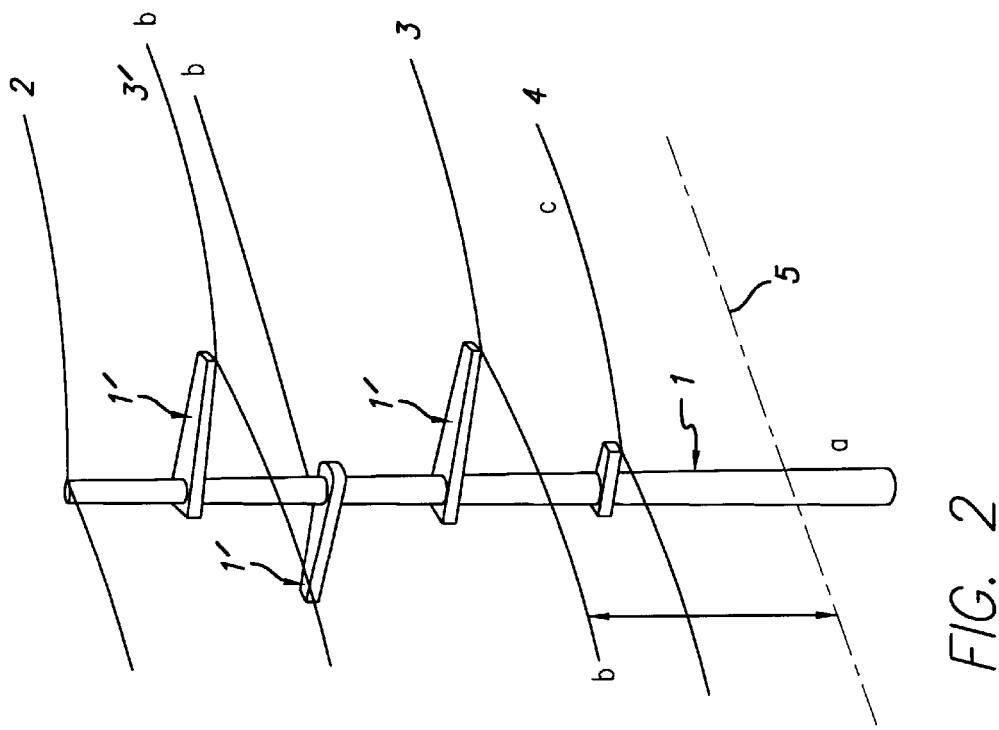
FIG. 2 is a schematic detail of the tower, which has been marked to illustrate the zone where the new tubular channeling unit is laid.

The tubular channeling unit (c), is held or secured through installation accessories which will secure the tubular channeling unit to an appropriate ground, and it is laid among the same towers (a), preferably in their columns (1) in a zone delimited at the lower side by the security level stated by the current general or zonal law, and inside the zone protected by the guard wire (p), and respecting the minimum electric and mechanical distances along the extension of the span as depicted in FIG. 4.

It has been contemplated that the external sheath may be formed of a metallic tube, a tubular metallic mesh, a hollow metallic helicoidal cable, a conductive plastic or polymer or some similar appropriate configuration.

The tubular channeling unit of the metallic or conductive sheath may have an external carrier for example, through the supply of an occluded cable along a longitudinal salient defining a figure "8" shape on the metallic or conductive sheath. The tubular channeling unit may have an internal carrier such as an extended cable along the cavity as a core. Further, the metal sheathing (4) may be formed of iron, steel, copper or any other appropriate metal.

For each line installation, in particular, this new apparatus and method allows the designer to take into account or to consider the following concepts: the minimum separation of the tubular channeling unit (c) with respect to the nearest energized conductors (3) along all the span among towers (a); the security regulations, the losses due the parasitic current, the unexpected line impedance modification; and the effects of the ice and snow gathering, and the birds on the lines. From the structural and electric point of view, it will allow the selection of the type of installation accessory to use, and also the best fastening point on the tower structure (a).

When applied to preexistent towers (a), consideration of their structure design and the foundations with respect to the additional load due to the metal sheathing (4) of the tubular channeling unit (c) will be required.

The minimum height of the optical cable with respect to the ground, in order to accomplish the regulating requirements, in particular with respect to the crossing over of lines with roads and other electric lines, may also be accounted for. The designer will also be able to take into account the requirements of grounding for the different types of structures used. Finally, the designer will have to verify that the tubular channeling unit will be inside of the protection zone of the guard wire (p).

In order to optimize the positioning of the channeling line, a study of the configuration of the electromagnetic fields in the transmission line has been carried out. For this study the following points have been taken into consideration:

a) High Voltage power transmission lines are predominately designed to operate under "balanced" conditions. For a balanced condition, the vector sums both of the instantaneous currents and the voltages with respect to ground on the power conductors is zero.

b) Under normal balanced operating conditions, the current flowing through the ground is negligible.

c) The inductive coupling and, as a first approximation, the capacitive coupling of the channeling line with each power conductor may be both considered as inversely proportional to the distance between the channeling line and the conductor.

d) In a more precise analysis of the capacitive coupling, the effects of the ground on the configuration of electric fields must be included.

It was determined that since the coupling between parallel conductors is inversely proportional to the distance between them, if a conductive element, such as a channeling line with metallic or conductive sheath is placed in an equidistant position with respect to the power conductors, the effects of the inductive coupling of the power conductors on the channeling line will cancel out. This particular position will be indicated as the Inductive Coupling Canceling Position (ICCP). Therefore, the induced voltage will be negligible and no parasitic currents will flow through the conductor positioned in channeling line located in the ICCP.

Further, for a channeling line or conductor placed within the ICCP, the capacitive coupling will be small since, if the effects of the ground on the electric field configuration are neglected, in the equidistant position the capacitive couplings between the power conductors and the channeling line will also cancel out. However, there will exist a residual capacitive coupling originated by the influence of the ground on the electric fields configuration. This residual coupling may be estimated in several ways, for instance, by means of the application of the theory of electrostatic images and the formalism of the coefficients of potential. This provides a greater precision in the determination of the position where the effects of the capacitive couplings cancel out, indicated as the Capacitive Coupling Cancellation Position (CCCP). This position has two remarkable properties. First, it is a local minimum of the electric field intensity. Second, on a grounded metallic or conductive element placed in the CCCP, no net electric charge will be induced.

It must be noted that in many cases the CCCP will be close to the ICCP, as long as the influence of the ground on the electric fields configuration may be neglected, for instance, when the distance between the power conductors of the line is appreciably smaller than the height of the power conductors with respect to the ground.

Upon determining the equidistant ICCP position, a Zone of Minimum Inductive Coupling (ZMIC) may be defined. This ZMIC is the locus of the points such that the difference of the distances of the channeling line to two of the power conductors is less than or equal to a certain maximum difference. Therefore, the limits of the ZMIC may be graphically portrayed as the intersection of hyperbolae with their focus placed at the position of the power conductors. The maximum difference of the distances may be determined as a function of the maximum allowable coupling between the channeling line and the power conductors. For instance, by selecting a maximum value of the voltage by unit length induced on a metallic or conductive sheathed channeling line, it is possible to determine the maximum difference of distances from the power lines to stay below the maximum value of the induced voltage.

For each line installation, in particular, this method allows consideration of the following concepts: the minimum separation of the tubular channeling unit with respect to the energized conductors along all the span among towers; the security regulations; and the effects of ice and snow loading.

The installation of the channeling line within the ZMIC presents the following advantages for the placement of channeling lines with a metallic or conductive sheath, since, when the line is under normal operating conditions, the induction of parasitic currents on the channeling line are minimized and the change of the impedance of the line is small. Furthermore, on a high voltage power line operating under normal conditions, the ZMIC has several advantages for the placement of channeling lines with a dielectric sheathing; it minimizes the degradation of the dielectric sheath due to the effects of electric fields and it is possible to use a conductive element, for instance, a metallic cable ("messenger wire") to support the channeling line. Since the net induced charge over the conductive element will be kept at a minimum, the dielectric sheath will not be affected by the electric field originated by the net induced charge in the conductive element.

EXAMPLE OF APPLICATION

Figure 5:
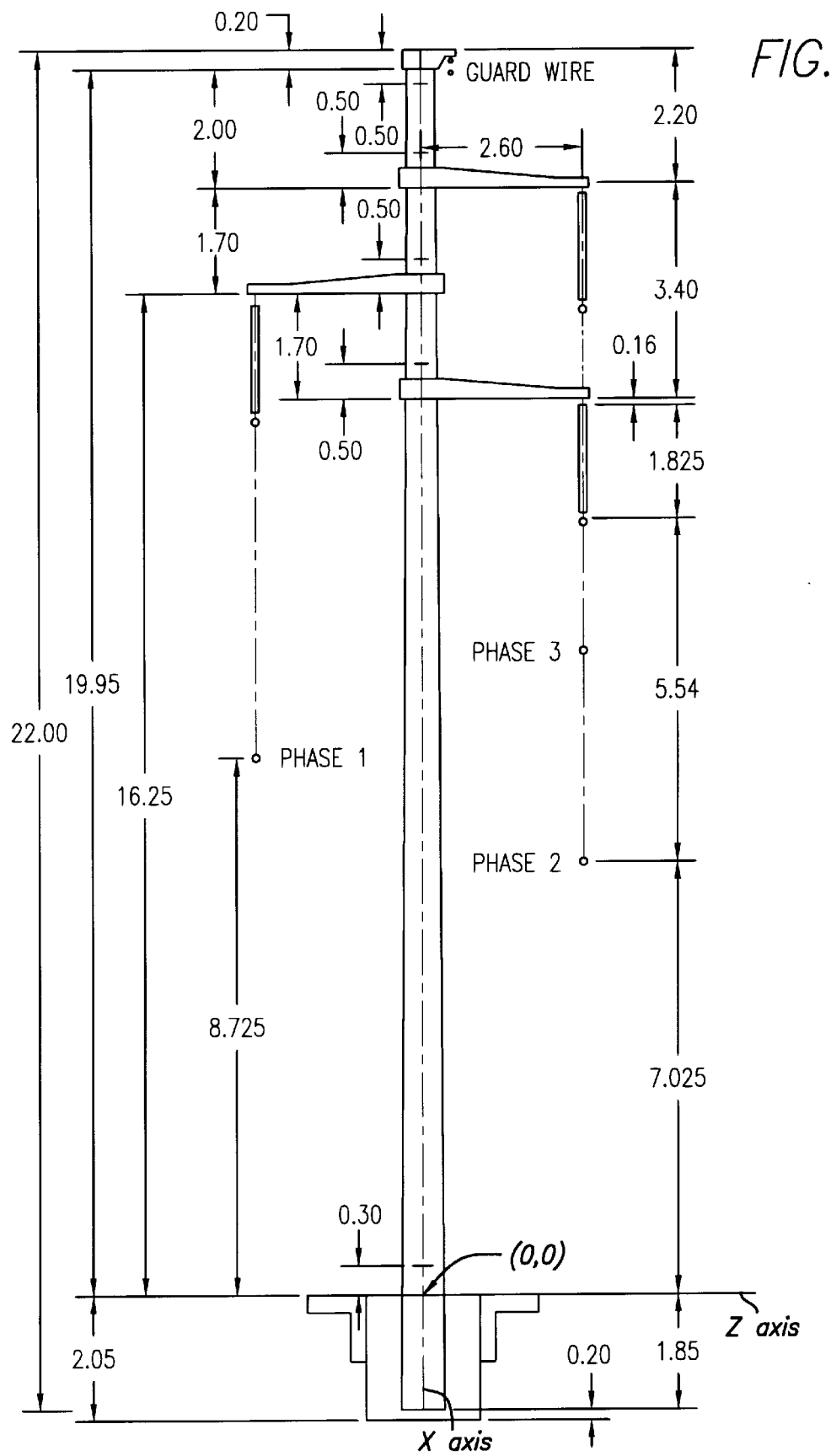
FIG. 5 is a schematic diagram of a tower and the electrical conductors thereon.
Figure 6:
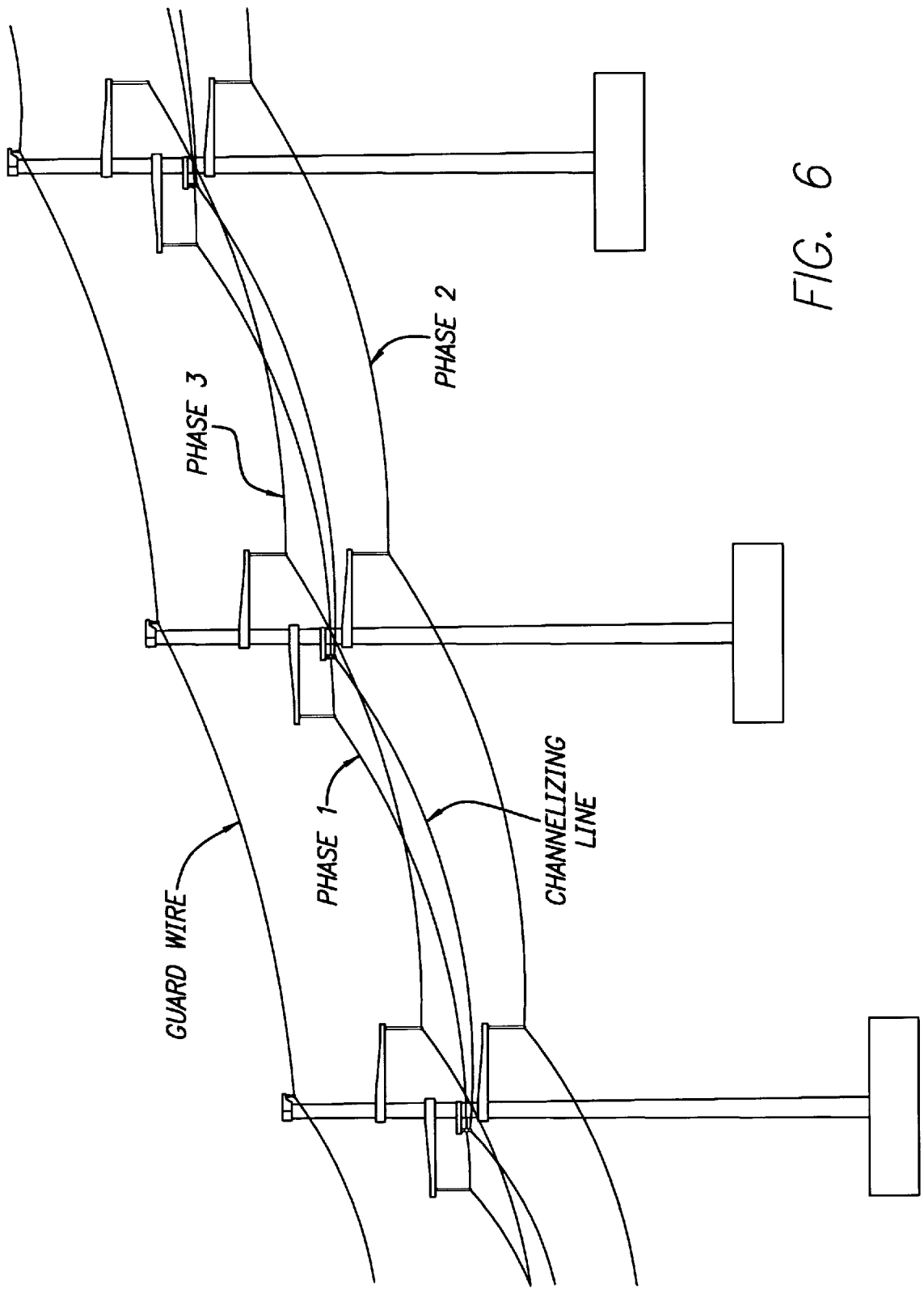
FIG. 6 is a perspective drawing of a section of the power line system, including the channeling line of the present invention.

As an illustration of the concepts in this application, the results of the calculations for a 132 Kv three-phase transmission line are presented below. A schematic diagram of the disposition of the towers and the conductors is depicted in FIG. 5. In all cases the line is assumed to be under normal operating conditions, with a positive phases sequence and a current of 100 A per phase, at a frequency of 50 Hz. FIG. 6 is a perspective drawing of a section of the line, including the channeling line, for the assembly depicted in FIG. 5.

The diameters and positions, at mid-span, of the power conductors and the guard wire are summarized in the following table, wherein the X coordinate represents the distance to the axis of the transmission line and the Z coordinate the height above ground level.

| Conductor | X [m] | Z[M] | Diameter [cm] |
|---|---|---|---|
| Phase 1 | −2.6 | 8.725 | 2.54 |
| Phase 2 | 2.6 | 7.025 | 2.54 |
| Phase 3 | 2.6 | 10.425 | 2.54 |
| G.W. | 0.5 | 19.650 | 1 |

The calculated coordinates of the coupling cancellation positions are

| Position | X [m] | Z[M] |
|---|---|---|
| ICCP | 0.278 | 8.725 |
| CCCP | 0.417 | 8.522 |

In FIG. 7 the electric field intensity has been plotted for a metallic or conductive channeling line placed at the ICCP, while FIG. 8 shows the results for the installation of the metallic or conductive channeling line at the CCCP. In both cases the channeling line is assumed to be grounded at each tower; the calculations have been carried out assuming a phase angle of 0' for Phase 1.

From the comparison of both figures it may be concluded that the placement of the metallic or conductive channeling line at the CCCP minimizes the effects on the electric field configuration.

FIG. 9 shows the electric field configuration without the metallic or conductive channeling line. The electric field intensity is indicated at the CCCP and the ICCP (for instance, for the installation of totally dielectric channeling lines).

FIG. 10 shows the intensity of the magnetic field (H-field) sustained by the power conductors, in order to compare the voltage induced by unit length on a metallic element placed at the CCCP and the ICCP (for example, for the installation of a channeling line).

A summary of the relevant results, as a function of the phase angle, is given below. Note that "IEI" indicates the absolute value of the electric field intensity, "IHI" the absolute value of the magnetic field intensity and Vi the voltage induced per unit length on a metallic element.

| i) | Instantaneous values at Phase Angle 0° | | | |
|---|---|---|---|---|
| Position | X [m] | Z[m] | IEI [V/m] | IHI [A/m] | Vi [V/m] |
| ICCP | 0.278 | 8.725 | $1.064 \cdot 10^4$ | 14.13 | $-6.44 \cdot 10$ |
| CCCP | 0.417 | 8.522 | $11.047 \cdot 10^4$ | 13.87 | $-7.82 \cdot 10^4$ |
| ii) | Instantaneous values at Phase Angle 60°: | | | |
| Position | X[m] | Z[m] | IEI [V/m] | IHI [A/m] | Vi[V/m] |
| ICCP | 0.278 | 8.725 | $7.809 \cdot 10^3$ | 9.897 | $3.21 \cdot 10^{-7}$ |

-continued

| | | | | | |
|---|---|---|---|---|---|
| CCCP iii) | 0.417 | 8.522 | $8.665 \cdot 10^3$ | 10.90 | $-9.90 \cdot 10^{-4}$ |
| | | Instantaneous values at Phase Angle 120°: | | | |
| Position | X[m] | Z[m] | \|E\| [V/m] | \|H\| [A/m] | Vi[V/m] |
| ICCP | 0.278 | 8.725 | $7.771 \cdot 10^3$ | 9.897 | $3.21 \cdot 10^{-7}$ |
| CCCP iv) | 0.417 | 8.522 | $7.442 \cdot 10^3$ | 9.461 | $-2.08 \cdot 10^{-4}$ |
| | | Instantaneous values at Phase Angle 240°: | | | |
| Position | X[m] | Z[m] | \|E\| [V/m] | \|H\| [A/m] | Vi[V/m] |
| ICCP | 0.278 | 8.725 | $7.809 \cdot 10^3$ | 9.897 | $3.21 \cdot 10^{-7}$ |
| CCCP v) | 0.417 | 8.522 | $8.665 \cdot 10^3$ | 10.90 | $-9.90 \cdot 10^{-4}$ |
| | | Instantaneous values at Phase Angle 300°: | | | |
| Position | X[m] | Z[m] | \|E\| [V/m] | \|H\| [A/m] | Vi[V/m] |
| ICCP | 0.278 | 8.725 | $7.771 \cdot 10^3$ | 9.897 | $3.21 \cdot 10^{-7}$ |
| CCCP | 0.417 | 8.522 | $7.442 \cdot 10^3$ | 9.461 | $-2.08 \cdot 10^{-4}$ |

The foregoing calculations are illustrative of the methodology by which the ICCP, CCP and ZMIC can be determined for a given power line system. Since each system will have its own structural criteria, tower construction and voltage load capacity, the determination of the ICCP, CCP and ZMIC will necessarily vary, but may determined utilizing the foregoing as a reference. Accordingly, for any given power line configuration, it will be possible for those skilled in the art to determine the ICCP, CCP and ZMIC, so that the channeling line may be appropriately positioned at, or proximate, these preferred locations in accordance with the present invention.

Certainly, when this invention begins to be used, it will be able to be modified with respect to certain construction and shape details. But this will not mean to leave the fundamentals ideas which are exposed in the appended claims.

List of the main references:
(a) Support tower
(b) High voltage cables
(c) Tubular channeling unit
(d) Security level
(e) Limit of the protected zone by the guard wire
(f) Tower columns (a)
(g) Tower arms (a)
(h) Guard wire
(i) High voltage conductors laid at a lower height
(j) External metal sheathing of (c)
(k) Aluminum pipe
(l) Optical fiber cables
(m) Dielectric core

What is claimed is:

1. A transmission conduit apparatus for installation on a high voltage aerial power line system including at least two towers supporting a set of high voltage electrical conductors suspended from the towers at a specified height above the ground in excess of a minimum predetermined safety level, the transmission conduit apparatus comprising:
a tubular channeling unit including a grounded external sheathing and an internal longitudinal cavity; said tubular channeling unit being attached to said at least two towers so as to be suspended in a Zone of Minimum Inductive Coupling (ZMIC) such that the difference of the distances of said tubular channeling unit to two of said electrical conductors is less than a predetermined maximum value.

2. The apparatus in accordance with claim 1 wherein the external sheathing is a metallic or conductive tubular wall and the tubular channeling unit further includes at least one pipe mounted within said sheathing, said at least one pipe defining a channeling cavity.

3. The apparatus in accordance with the claim 1, wherein the external sheathing is a steel tubular wall that sheaths at least one aluminum pipe that forms a channeling cavity.

4. The apparatus in accordance with the claim 1, wherein the external sheathing is a metallic tubular mesh that sheaths at least one pipe that forms a channeling cavity.

5. The apparatus in accordance with the claim 1, wherein the external sheathing is a hollow helicoidal cable that sheaths at least one aluminum pipe that forms a channeling cavity.

6. The apparatus in accordance with the claim 1, wherein said tubular channeling unit further comprises a supporting element.

7. The apparatus in accordance with the claim 6, wherein said supporting element is affixed externally to said external sheathing.

8. The apparatus in accordance with the claim 6, wherein the supporting element is mounted within said external sheathing.

9. The apparatus in accordance with the claim 8, wherein the supporting element is a steel cable which forms a core around which optical fiber cables are arranged.

10. The apparatus in accordance with the claim 6, wherein the tubular channeling unit is self-supporting through said external sheathing.

11. The apparatus in accordance with the claim 1, further comprising:
a plurality of transmission lines for optical signals mounted within and extending through said tubular channeling unit.

12. The apparatus in accordance with the claim 1, further comprising:
transmission lines for electromagnetic signals mounted within and extending through said tubular channeling unit.

13. The apparatus in accordance with the claim 1, further comprising:
a plurality of optical fiber cables mounted within and extending through said tubular channeling unit.

14. The apparatus in accordance with the claim 1, further comprising:
at least one electric cable mounted within and extending through said tubular channeling unit.

15. The apparatus in accordance with the claim 1, further comprising:
a plurality of telephone cables mounted within and extending through said tubular channeling unit.

16. The apparatus in accordance with the claim 1, further comprising:
a plurality of coaxial cables mounted within and extending through said tubular channeling unit.

17. The apparatus in accordance with the claim 1, further comprising:
several twisted pairs of cables for the transmission of signals in communication systems mounted within and extending through said tubular channeling unit.

18. The apparatus in accordance with the claim 1, wherein the tubular channeling unit is suitable for allowing the contained transmission of fluids.

19. The apparatus in accordance with the claim 1, wherein the tubular channeling unit is suitable for allowing the contained transmission of fluids in gaseous and liquid phases.

20. A method of laying a transmission conduit apparatus by suspension on a high voltage aerial power line system including at least two towers supporting a set of high voltage electrical conductors suspended from the towers at a specified height above the ground in excess of a minimum predetermined safety level, the method of laying the transmission conduit apparatus comprising:

providing a tubular channeling unit including a grounded external metal sheathing and an internal longitudinal cavity; and attaching said tubular channeling unit to said at least two towers so as to suspend said tubular channeling unit in a zone such that the difference of the distances of said tubular channeling unit to two of said electrical conductors is less than a certain maximum value determined as a function of a maximum allowable magnetic induction coupling between said channeling unit and said electrical conductors.

21. A method of laying a transmission conduit apparatus by suspension on a high voltage aerial power line system including at least two towers supporting a set of high voltage electrical conductors suspended from the towers at a specified height above the ground in excess of a minimum predetermined safety level, the method of laying the transmission conduit apparatus comprising:

providing a tubular channeling unit including an external dielectric sheathing and an internal longitudinal cavity; and attaching said tubular channeling unit to said at least two towers so as to suspend said tubular channeling unit in a zone such that the difference of the distances of said tubular channeling unit to two of said electrical conductors which ever is less than a certain maximum value, that may be determined as a function of the maximum allowable electric field intensity on the dielectric sheathing of said channeling unit.

22. A method of laying a transmission conduit apparatus by suspension on a high voltage aerial power line system including at least two towers supporting a set of high voltage electrical conductors suspended from the towers at a specified height above the ground in excess of a minimum predetermined safety level, the method of laying the transmission conduit apparatus comprising:

providing a tubular channeling unit including an external dielectric sheathing and an internal longitudinal cavity supported by a grounded element; and attaching said grounded element to said at least two towers so as to suspend said tubular channeling unit in a zone such that the difference of the distances of said grounded element to two of said electrical conductors is less than a certain maximum value determined as a function of the maximum allowable electric field intensity on the dielectric sheathing of said channeling unit.

* * * * *